(12) United States Patent
Lacko

(10) Patent No.: US 9,783,313 B2
(45) Date of Patent: Oct. 10, 2017

(54) INSTALLING OR REMOVING AIRCRAFT ENGINES

(71) Applicant: ROHR, INC., Chula Vista, CA (US)

(72) Inventor: Anthony J. Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 134 days.

(21) Appl. No.: 14/747,521

(22) Filed: Jun. 23, 2015

(65) Prior Publication Data
US 2016/0376015 A1 Dec. 29, 2016

(51) Int. Cl.
| B64D 27/26 | (2006.01) |
| B64F 5/00 | (2017.01) |
| B64D 29/06 | (2006.01) |
| B64F 5/50 | (2017.01) |
| B64F 5/10 | (2017.01) |

(52) U.S. Cl.
CPC ............ *B64D 27/26* (2013.01); *B64D 29/06* (2013.01); *B64F 5/10* (2017.01); *B64F 5/50* (2017.01)

(58) Field of Classification Search
CPC ....... B64D 27/26; B64D 29/06; B64F 5/0009; B64F 5/10; B64F 5/50
See application file for complete search history.

(56) References Cited

U.S. PATENT DOCUMENTS

| 6,021,636 | A | 2/2000 | Johnson |
| 6,260,801 | B1 | 7/2001 | Peters et al. |
| 6,584,763 | B2 | 7/2003 | Lyons et al. |
| 7,007,454 | B2 | 3/2006 | Dehu et al. |
| 9,482,113 | B2 * | 11/2016 | Graily .................. F01D 25/145 |
| 2010/0181418 | A1 | 7/2010 | Vauchel et al. |
| 2014/0116024 | A1 | 5/2014 | Channel |
| 2014/0131515 | A1 | 5/2014 | Caruel |
| 2015/0098810 | A1 | 4/2015 | Soria |
| 2015/0136875 | A1 | 5/2015 | Lacko |

FOREIGN PATENT DOCUMENTS

| WO | 9306008 | 4/1993 |
| WO | 2014206380 | 12/2014 |

OTHER PUBLICATIONS

Extended European Search Report dated Nov. 18, 2016 in European Application No. 16175727.3.

* cited by examiner

*Primary Examiner* — John C Hong

(74) *Attorney, Agent, or Firm* — Snell & Wilmer, L.L.P.

(57) ABSTRACT

A nacelle may include a thrust reverser. The inner fixed structure may include an IFS support and movable portions which hinge open at hinges between the IFS support and the movable portions. The IFS support may be coupled to the engine core. Standard ground support equipment may be coupled to attachment features on the IFS support to attach or remove an engine from an aircraft wing with the IFS attached to the engine.

15 Claims, 5 Drawing Sheets

INSTALLING OR REMOVING AIRCRAFT ENGINES

FIELD

The disclosure generally relates to turbofan propulsion systems for aircraft. More particularly, the disclosure relates to methods for installing and removing propulsion systems from an aircraft.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a thrust reverser which has a translating sleeve and an inner fixed structure.

In conventional thrust reversers, the translating sleeve and the inner fixed structure are connected and hinge open together at a hinge attached to the pylon. In order to install an engine on an aircraft wing, hoists are coupled to the pylon with the thrust reverser hinged open or removed completely, and cables are coupled to the hoists and to attachment features or other attachment points provided on the engine case. The engine is then lowered or raised by the hoists and the cables. However, some thrust reverser designs will not allow for easy access to attachment features on the engine case because of their different structure. For example, in co-pending U.S. patent application Ser. No. 14/508,637 from the same assignee as this invention, Rohr, Inc., a UTC Aerospace Systems Company, the contents of which are hereby incorporated by reference in their entirety, a nacelle system is proposed in which several embodiments include an inner fixed structure around the engine core that does not hinge open with the rest of the thrust reverser structure, and thus opening the thrust reverser does not provide ready access to attachment features provided on the engine case. This invention proposes a solution for how to attach ground support equipment such as hoists and cables to an engine with these or similar nacelle features.

SUMMARY

A method of installing an aircraft engine may comprise coupling a first cable to a forward hoist and a forward attachment feature on an IFS support, wherein the IFS support is coupled to an engine core. A second cable may be coupled to an aft hoist and an aft attachment feature on the IFS support. The aircraft engine may be raised to a pylon using the first cable and the second cable. An engine mount may be coupled to a pylon mount.

In various embodiments, the IFS support and at least one movable portion may form an inner fixed structure. The inner fixed structure may remain coupled to the aircraft engine during the raising. The method may comprise hinging a translating sleeve closed to form a bypass duct between the translating sleeve and the inner fixed structure. The method may comprise removing the forward hoist and the aft hoist from the pylon. The aircraft engine may comprise a bifurcation panel which is formed separately from a movable portion of the inner fixed structure. The engine mount may be coupled to the IFS support. The inner fixed structure may form a damage shield around the engine core.

A method of assembling an aircraft propulsion engine may comprise attaching an inner fixed structure ("IFS") support to an engine core. A first movable portion may be coupled to the IFS support, wherein the first movable portion is movable relative to the IFS support, the first movable portion and the IFS support together helping to define a fire-sealed space around the engine core. Ground support lifting equipment may be mounted to at least one attachment feature on the IFS support. The engine may be lifted into position for attachment to an engine mount on an aircraft.

In various embodiments, the IFS support and the first movable portion form an inner fixed structure. The inner fixed structure may remain coupled to the engine during the lifting. A translating sleeve may be hinged open to access the IFS support. A forward hoist and an aft hoist may be coupled to a pylon, wherein a plurality of cables couple the forward hoist and the aft hoist to the at least one attachment feature. The engine may comprise a composite bifurcation panel and a metallic inner fixed structure. A translating sleeve may be closed around the IFS support and the first movable portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Methods for attaching and removing an aircraft engine are disclosed. The thrust reverser may comprise a translating sleeve and an inner fixed structure ("IFS"). The IFS may comprise an IFS support which is coupled to the engine case(s). The IFS may further comprise one or more movable portions coupled to the IFS support. The IFS support and the movable portions may be separate from (not integral to or attached to) any bifurcation walls. The IFS may surround the engine core. The IFS support may comprise a plurality of attachment features. Ground support equipment may attach to the attachment features on the IFS support in order to install or remove the engine with the IFS coupled to and surrounding the engine core.

Figure 1:
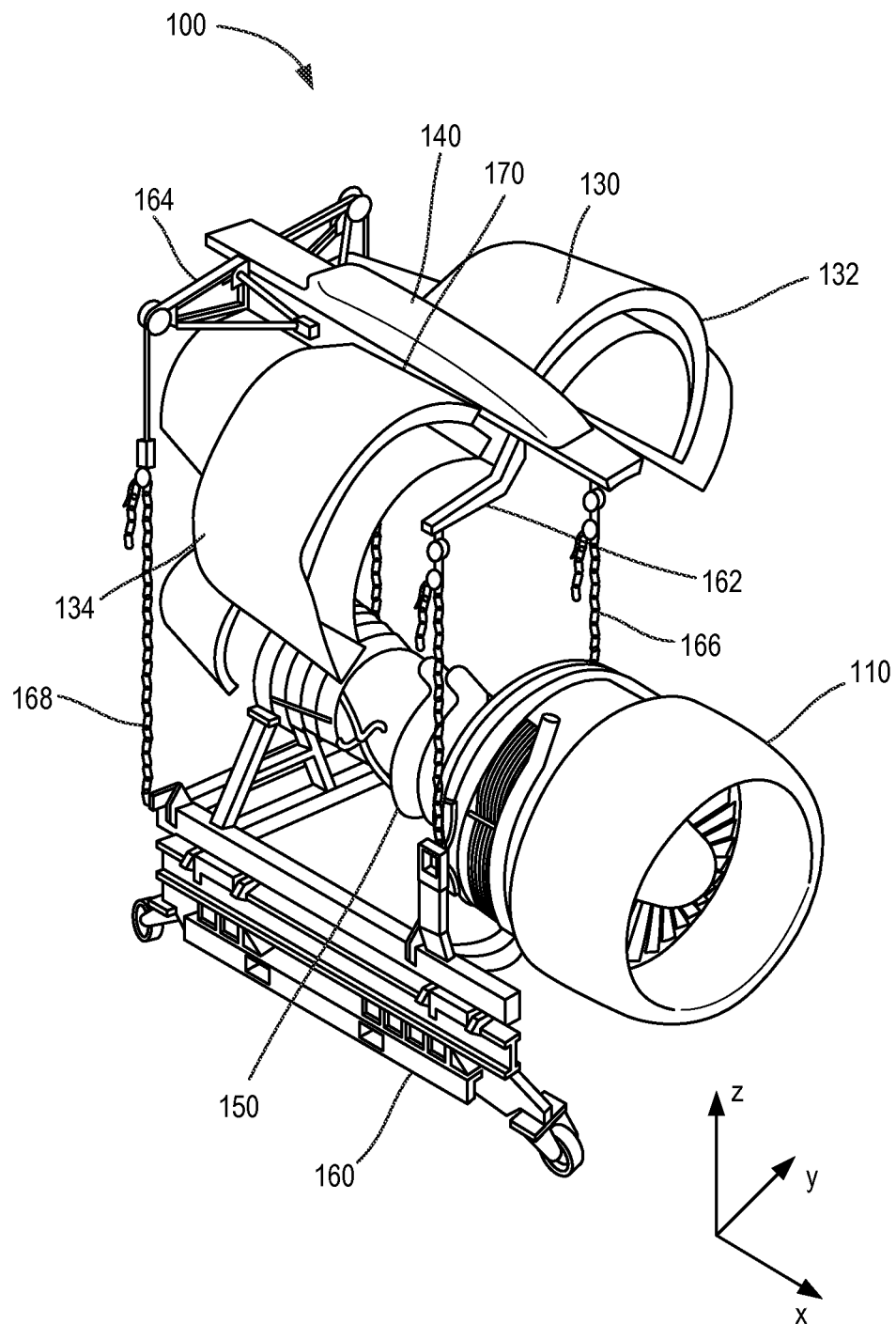
FIG. 1 illustrates a perspective view of a prior art nacelle.

Referring to FIG. 1, a prior art nacelle 100 for a gas turbine engine is illustrated according to various embodiments. X-y-z axes are shown for ease of illustration. As used herein with reference to each figure, the term forward represents the positive x-direction, the term rear or aft represents the negative x-direction, the term left represents the positive y-direction, the term right represents the negative y-direction, the term down represents the negative z-direction, and the term up represents the positive z-direction. The nacelle 100 may comprise an inlet 110, a fan cowl (not shown), and a thrust reverser 130. The thrust reverser 130 may couple to a pylon 140, which may mount the nacelle 100 to an aircraft wing.

The thrust reverser 130 may comprise a left thrust reverser half 132 and a right thrust reverser half 134 coupled to the pylon 140. The left thrust reverser half 132 and the right thrust reverser half 134 may hinge open at hinges 170. The left thrust reverser half 132 and the right thrust reverser half 134 may hinge open at hinges 170 in order to provide access to the engine core 150 for attachment or removal of the engine core 150 from the pylon 140. The left thrust reverser half 132 and the right thrust reverser half 134 may together help form the exterior of the nacelle 100 when the left thrust reverser half 132 and the right thrust reverser half 134 are closed. The left thrust reverser half 132 and the right thrust reverser half 134 may be latched together at the bottom of the nacelle 100 where the left thrust reverser half 132 and the right thrust reverser half 134 meet.

With a prior art method, the engine core 150 may be removed for maintenance or replacement. In order to remove the engine core 150, the thrust reverser halves 132, 134 may be hinged open. Forward hoists 162 and aft hoists 164 may be attached to the pylon 140. Forward cables (which may be a wire rope type cable, or a chain, or other appropriate lifting implement as may be selected to suit a particular environment) 166 may be coupled to the forward hoists 162 and a forward attachment feature on the engine core 150 or the fan case. Aft cables 168 may be coupled to the aft hoist 164 and an aft attachment feature on the turbine section of the engine core 150. The engine core 150 may be detached from the pylon 140, and the forward cables 166 and aft cables 168 may be used to lower the engine core 150 onto a trolley 160.

Figure 2:
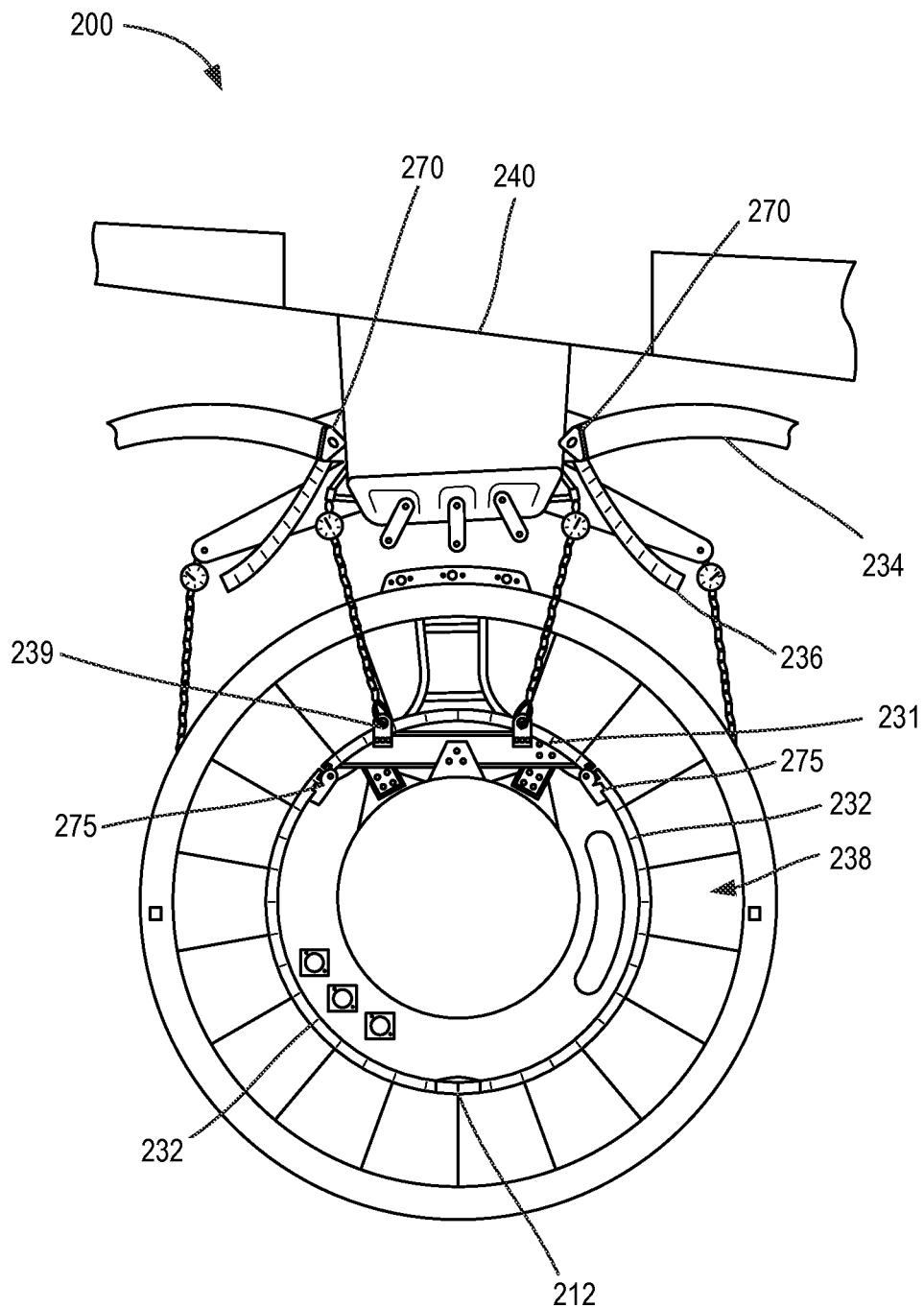
FIG. 2 illustrates a cross-section view of a thrust reverser with the translating sleeve hinged open in accordance with various embodiments of the disclosure.

The prior art method described above will not apply to a thrust reverser design where simply opening the thrust reverser halves does not also expose the GSE attachment features on the engine. Referring to FIG. 2, a cross-section view of such a thrust reverser 200 with the translating sleeve 234 hinged open is illustrated according to various embodiments. The thrust reverser 200 may comprise an IFS and a translating sleeve 234, which together help define a bypass air duct 238. The IFS may comprise an IFS support 231 and movable portions 232, which together form a barrel-shaped enclosure around an engine core. In various embodiments, the IFS support 231 may be coupled to the engine core and provide a load path to raise or lower the engine. The thrust reverser 200 may comprise bifurcation panels 236 separate from the IFS. In various embodiments, the movable portions 232 may be a bonded panel formed from a metallic inner skin, a metallic hexagonal (or other shape) core, and a metallic perforated outer skin, all bonded together in a known manner through an appropriate process such as welding, brazing or liquid interface diffusion bonding. In various embodiments, at least one of the metallic inner skin, the metallic core, or the metallic perforated outer skin may comprise titanium.

The separate bifurcation panels 236 may be formed as composite bonded panels, with carbon fiber reinforced epoxy inner and outer skins bonded to a hexagonal (or other shape) core in the center to form a strong, lightweight structure in a known manner. In various embodiments, one or more outer skins are perforated.

The IFS support 231 and the movable portions 232 may fit together so that they form a generally barrel-shaped fire sealing chamber around the engine core. The movable portions 232 fit together at joints 212. Fire seals may be fit in these joints 212 to create a sealed environment around the engine core that tends to direct fire or hot gases forward or aft away from the nacelle. The movable portions 232 may be fastened or clamped to one another to create a damage shield around the engine which prevents damage to the wing and fuselage in the event of an engine failure.

Penetrations may be provided through the IFS support 231 to bring ducts, wires, harnesses, tubes, and engine mounting structures through the IFS and to the engine core. One or more of these penetrations may be sealed to maintain a fire-sealed environment inside the IFS. Provisions may be added to provide pressure relief of an over pressurized engine core compartment.

Because the movable portions 232 and the IFS support 231 define and form the fire-sealed chamber around the engine core, the bifurcation panels 236 are not exposed to the high temperature environment around the engine core, and can be made from the previously described composite panels without any heat blanket protection or dedicated fire sealing.

Unlike in traditional thrust reversers, the bifurcation panels 236 and the movable portions 232 may be separate components. Thus, the translating sleeve 234 and the movable portions 232 may hinge open independently. The translating sleeve 234 may hinge to the pylon 240 at hinges 270 and couple together at a latch. The movable portions 232 may be coupled to the IFS support 231. The movable portions 232 may move relative to the IFS support 231 in a variety of manners, such as by hinging, sliding, or detaching. The movable portions 232 may hinge to the IFS support 231 at hinges 275. The IFS support 231 may be mounted to the engine case. In the case when the movable portions 232 are hinged relative to the IFS support 231, FIG. 2 illustrates that a significant portion of the core engine would remain not easily accessible. In other words, even with movable portions 232 hinged open, it may not be possible to attach GSE to attachment features formed on the engine case, because access to them is still obscured by the IFS structure. A plurality of attachment features 239 may be coupled to the IFS support 231. The attachment features 239 may comprise lugs, eye bolts, or any other type of component suitable for carrying the weight of the engine.

Figure 3:
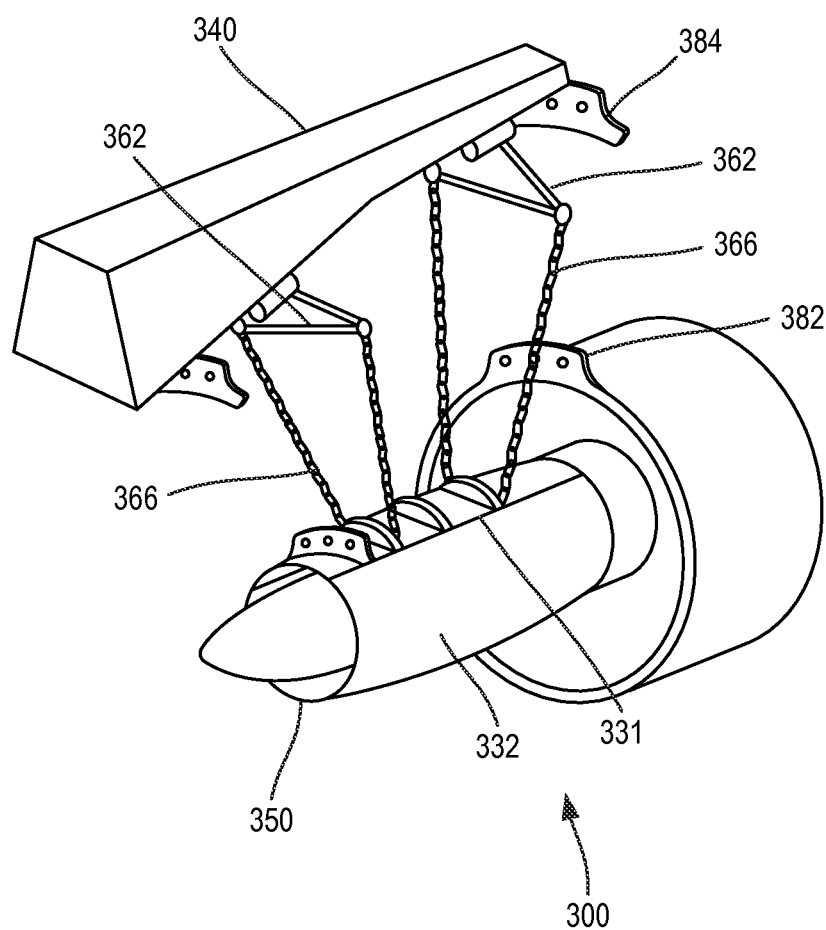
FIG. 3 illustrates a perspective view of an engine separated from a pylon in accordance with various embodiments of the disclosure.

Referring to FIG. 3, a perspective view of an engine 300 separated from a pylon 340 is illustrated according to various embodiments. The engine 300 is illustrated with the translating sleeves removed for clarity. The methods described may be performed with the translating sleeves removed or hinged open. The movable portions 332 and the IFS support 331 are hinged closed and remain attached to and encircle the engine core 350. A plurality of attachment features may be coupled to the exterior of the IFS support 331 that are accessible when the IFS is closed.

Hoists 362 may be coupled to the pylon 340. In various embodiments, the hoists 362 may be attached after the thrust reverser is opened. The cables 366 may be coupled to the hoists 362 and the attachment features on the IFS support 331. The connection between the IFS support 331 and the engine core 350 may be sufficiently strong to support the weight of the engine 300. Thus, standard ground support equipment may be used with minor or no modifications to install and remove engines with separate bifurcation panels and inner fixed structures. Once the engine 300 is raised using the cables 366, the engine mounts 382 may be coupled to the pylon mounts 384.

Figure 4:
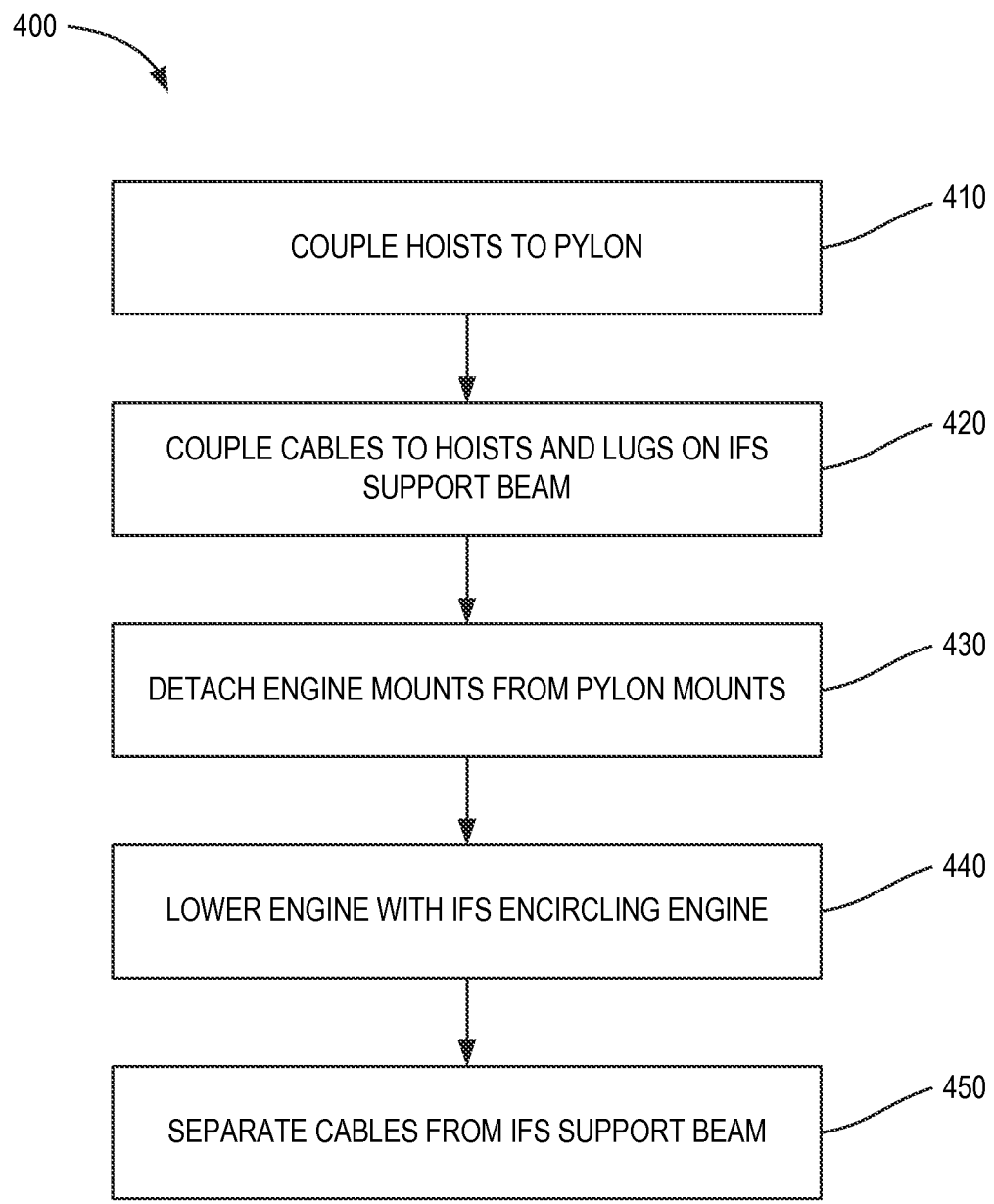
FIG. 4 illustrates a flowchart of a process for removing an engine from a pylon in accordance with various embodiments of the disclosure.

Referring to FIG. 4, a flowchart 400 of a process for removing an engine from a pylon is illustrated according to various embodiments. An engine may be mounted on a wing. The thrust reverser translating sleeves may be hinged open at the pylon. A forward hoist and an aft hoist may be coupled to the pylon (step 410). One or more forward cables may be coupled to the forward hoist and forward attachment features on the IFS support (step 420). One or more aft cables may be coupled to the aft hoist and aft attachment features on the IFS support. Wiring and other system components which attach to both the aircraft and the engine may be detached from at least one of the aircraft or the engine. A forward engine mount may be detached from a forward pylon mount, and an aft engine mount may be detached from an aft pylon mount (step 430). The engine may be lowered by the cables with the IFS encircling the engine. The engine may be lowered onto a trolley (step 440). The cables may be separated from the attachment features on the IFS support, and the engine may be transported on the trolley (step 450).

Figure 5:
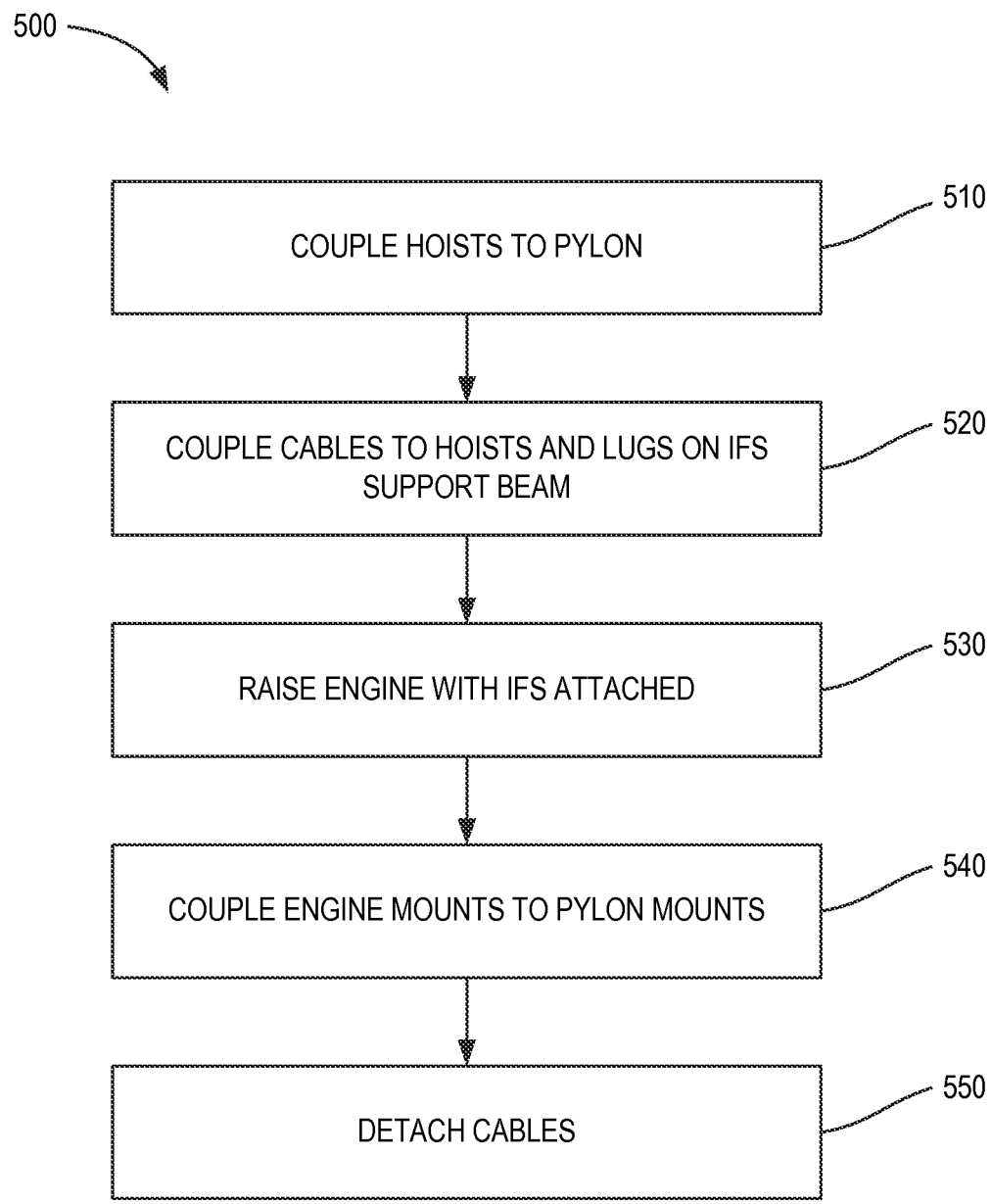
FIG. 5 illustrates a flowchart of a process for installing an engine to a pylon in accordance with various embodiments of the disclosure.

Referring to FIG. 5, a flowchart 500 of a process for installing an engine on a pylon is illustrated according to various embodiments. The engine may be located on a trolley, and the trolley may be positioned under the pylon. The IFS support and movable portions may encircle the engine core. A forward hoist and an aft hoist may be coupled to the pylon (step 510). One or more forward cables may be coupled to the forward hoist and forward attachment features on the IFS support (step 520). One or more aft cables may be coupled to the aft hoist and aft attachment features on the IFS support. The engine may be raised by the cables with the IFS encircling the engine (step 530). A forward engine mount may be coupled to a forward pylon mount, and an aft engine mount may be coupled to an aft pylon mount (step 540). Systems and wiring may be reattached. The cables and hoists may be detached from the pylon and engine (step 550). The translating sleeve may be hinged closed, forming a portion of the bypass duct with the IFS.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method of installing an aircraft engine comprising:
coupling a first cable to a forward hoist and a forward attachment feature on an inner fixed structure ("IFS") support, wherein the IFS support is coupled to an engine core;
coupling a second cable to an aft hoist and an aft attachment feature on the IFS support;
raising the aircraft engine to a pylon using the first cable and the second cable; and
coupling an engine mount to a pylon mount.

2. The method of claim 1, wherein the IFS support and at least one movable portion form an inner fixed structure.

3. The method of claim 2, wherein the inner fixed structure remains coupled to the aircraft engine during the raising.

4. The method of claim 2, further comprising hinging a translating sleeve closed to form a bypass duct between the translating sleeve and the inner fixed structure.

5. The method of claim 4, wherein the aircraft engine comprises a bifurcation panel which is formed separately from a movable portion of the inner fixed structure.

6. The method of claim 2, wherein the inner fixed structure forms a fire barrier around the engine core.

7. The method of claim 1, further comprising removing the forward hoist and the aft hoist from the pylon.

8. The method of claim 1, wherein the engine mount is coupled to the IFS support.

9. A method of assembling an aircraft propulsion engine comprising:
- attaching an inner fixed structure ("IFS") support for an IFS to an engine core;
- mounting a first movable portion of the IFS to the IFS support, wherein the first movable portion is movable relative to the IFS support, the first movable portion and the IFS support together helping to define a fire-sealed space around the engine core;
- mounting ground support lifting equipment to at least one attachment feature on the IFS support; and
- and lifting the engine into position for attachment to an engine mount on an aircraft.

10. The method of claim 9, wherein the IFS support and the first movable portion form the IFS.

11. The method of claim 10, wherein the IFS remains coupled to the engine during the lifting.

12. The method of claim 10, further comprising hinging a translating sleeve open to access the IFS support.

13. The method of claim 12, wherein the engine comprises a composite bifurcation panel and a metallic inner fixed structure.

14. The method of claim 9, further comprising coupling a forward hoist and an aft hoist to a pylon, wherein a plurality of cables couple the forward hoist and the aft hoist to the at least one attachment feature.

15. The method of claim 9, further comprising closing a translating sleeve around the IFS support and the first movable portion.

* * * * *